United States Patent [19]
Kugler et al.

[11] 4,184,748
[45] Jan. 22, 1980

[54] DEVICE FOR EXPANDING PRACTICALLY PARALLEL LIGHT RAYS

[76] Inventors: Hans-Peter Kugler, Saldingerstr. 16, D-7507 Pfinztal-4; Norbert Eisenreich, Amselstr. 16, D-7507 Pfinztal-1, both of Fed. Rep. of Germany

[21] Appl. No.: 845,724

[22] Filed: Oct. 26, 1977

[30] Foreign Application Priority Data

Oct. 30, 1976 [DE] Fed. Rep. of Germany ........ 2650023

[51] Int. Cl.² .................................................. G02B 3/06
[52] U.S. Cl. ................................................... 350/190
[58] Field of Search .......................................... 350/190

[56] References Cited
U.S. PATENT DOCUMENTS

| | | |
|---|---|---|
| 2,980,802 | 4/1961 | Bracey et al. ............... 350/190 X |
| 3,535,023 | 10/1970 | Yamanaka et al. .......... 350/189 |
| 3,964,824 | 6/1976 | Dixon .......................... 350/190 |

*Primary Examiner*—Paul A. Sacher
*Attorney, Agent, or Firm*—Craig and Antonelli

[57] ABSTRACT

A parallel pencil of light, for example, a laser beam, is expanded by means of a cylindrical lens. The lens is fully cylindrical and has an optically thinner medium of cylindrical shape in its interior. The lens is arranged relative to the pencil of light so that total reflection occurs at the interface with the optically thinner medium.

8 Claims, 5 Drawing Figures

DEVICE FOR EXPANDING PRACTICALLY PARALLEL LIGHT RAYS

The invention relates to a device for expanding a practically parallel pencil of light by means of a cylindrical lens.

The two-dimentional expansion of practically parallel pencils of light is the subject of many optical systems necessitating a high technical expenditure, at least if the expanded pencil of light is to have major aperture angles. The conventional method consists in using so-called cylindrical lenses which, as a rule, are only partly cylindrical in design. A laser may serve, for example, as the light source for producing a practically parallel pencil of light.

The task underlying the invention is to design a device of the above-mentioned kind in such a way that a practically parallel pencil of light is expanded two-dimensionally to an aperture angle of up to 360° with an intensity distribution that is practically constant.

According to the invention, this task is solved in that the lens is of fully cylindrical design and comprises in the lens interior at least one optically thinner medium in cylindrical shape, the lens being arranged relative to the pencil of light in such a way that total reflection occurs on the interface with the optically thinner medium.

The device thus comprises a kind of tubular lens. Along the interface between the optically denser medium, the tube jacket, and the optically thinner medium, the tube interior, reflection or total reflection occurs in addition to refraction, whereby closed light surfaces are formed. If the lens, whose geometrical axis is developed according to the invention, is aligned perpendicularly to the parallel pencil of light, for example a laser beam, then there is formed in the plane which is vertical to the lens and in which the laser beam is also disposed, a closed light surface whose intensity distribution is practically uniform and which covers, at least theoretically, the entire plane, i.e. a light curtain in the form of a conical envelope with an aperture angle of 180°. In any other angular arrangement of the lens axis relative to the beam axis, a conical envelope of an aperture angle of less than 180° is produced. Irrespective of the lens diameter and the diameter of the optically thinner medium as well as the bundle of rays, the design and arrangement always has to be such that a portion of the bundle of rays is totally reflected along the interface between the lens and the optically thinner medium, i.e. at least a proportion of the rays has to enter the lens in this interfacial area. The principle according to the invention can be applied in many ways in engineering. The penetration of objects through this light surface, can be detected either by registering the stray light scattered by the objects by means of detectors or by means of object-dependent detector adumbration. In the second case, the use of selective detectors even makes it possible to determine the penetration point. Furthermore, it is possible to produce these light surfaces, for example, in parallel planes at defined distances, in order to measure the speed of moving objects with this arrangement. Compared with conventional methods using light barriers, the penetration area in which the measurement can be effected is no longer limited by the extension of the light barriers, but can be extended to any distance and angle. Furthermore, it is thus possible to produce a light surface which intersects a space to be protected against fire. One or more detectors are fitted at a suitable point outside the light surface in such a way that light scattered from any area of the light surface can pass to at least one of the detectors. If smoke particles pass through the light surface, then the scattered light produced thereby reaches and triggers a detector, whereupon suitable measures can be initiated as a result.

Another application is, for example, the reduction of the risk of accidents happening when work is performed on machines, such as punching, pressing or the like. The lens according to the invention is arranged, together with a laser, in front of the moved machine parts in such a way that a light surface is produced between the operator of the machine and the dangerous area of the machine. As long as the operator is in the dangerous area, the light field is still penetrated, i.e. scattered light is still present, so that the detectors are still activated and will stop the working cycle of the machine. If this safety measure were to be implemented with conventional light optics means, with a normal light source and photoelectric cell, a considerable expenditure would be required for the production of a corresponding "light wall".

The light-optical scanning of objects according to size and contour such as is necessary, for example, for the assortment of piece goods can also be brought about, according to the invention, by a single linear movement of the device, the light field produced thereby sweeping over the object and several detectors being arranged in a screen-like manner on the opposite side. In the conventional method, this necessitates either a plurality of light sources arranged in appropriate screens or else a light source which is moved in two co-ordinates.

If the lens designed according to the invention is positioned at an angle to a laser beam, then a conical surface with a constant intensity distribution is produced in the space instead of the flat light surface. This light surface which can be produced by means of the device according to the invention may be used, for example, for protecting small-sized objects against theft, in that the object to be protected is enveloped by a conical surface. The indication of any scattered light by detectors indicates an unauthorised approach, whereupon consequential measures can be initiated. The conical surface is only closed within itself if the diameter of the tube used is very small. As the tube diameter increases, the conical surface changes to form a spiral surface, i.e. a conical surface with an increasing or decreasing aperture angle.

Other types of application of the lens designed according to the invention consist, for example, in the combined production of flat and curved light surfaces. By this means, it is possible to produce, for example, airport lighting, air space limits, marker surfaces and approach points.

Furthermore possible is an application as two-dimensional laser Doppler anemometry (LDA). For punctual LDA, two laser beams are caused to intersect and at the point of intersection the speed of micro-particles can be measured due to the differential Doppler shift. Analogously, light surfaces may be used for extending the measurement volume in one direction, as desired.

It is also possible to use the lens designed according to the invention in conjunction with extremely short-wave or long-wave laser light, for example in the infrared range. Futhermore, the range of application is not confined to visible light only; on the contrary, it is possible to use any directional electromagnetic source of radiation, such as a maser. In this connection, the two coaxial media must have, according to the invention, different refraction indices relative to the wave length of the electromagnetic radiation used.

Finally, the device designed according to the invention may also be combined with other conventional lens and mirror systems. For example, if the lens according to the invention is arranged in the focal point of a conventional biconvex lens, then the conical surface can be transformed into a cylindrical surface. By applying a reflecting coating on portions of the surface of the lens designed according to the invention, the light intensity concentration to specific aperture angles can be brought about.

According to a preferred constructional form, there is arranged in the interior of the lens only one cylindrical optically thinner medium which, moreover, is coaxial to the cylindrical lens. If the lens is designed as a tube with a circular cross section, the advantage is provided that glass tubes of adequate optical purity which are available on the market can be used according to the invention. Thus, there is no need for any complicated optical systems.

Further features, details and advantages of the invention will emerge from the following description of a preferred constructional form shown in the drawings, in which.

Figure 1:
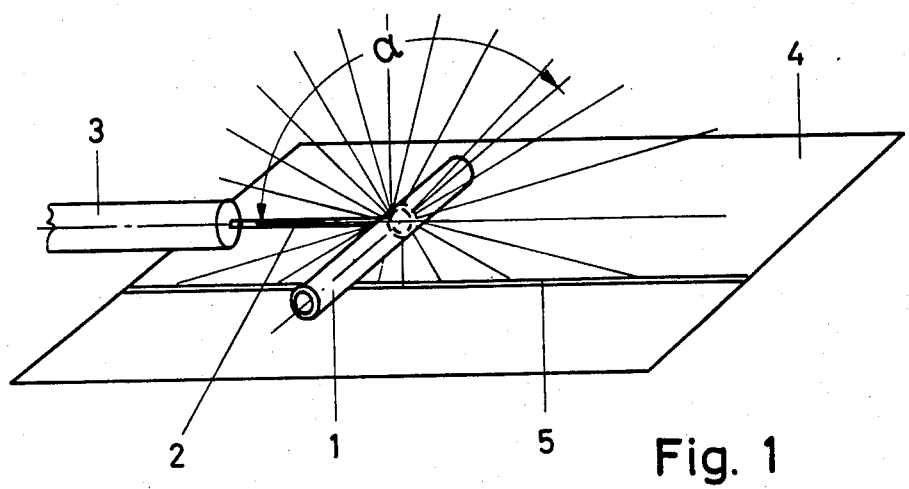
FIG. 1 is a diagrammatical view of a device comprising a laser and a tubular lens.

The device shown in FIG. 1 consists of a lens designated by 1 and a light source 3, for example a laser, producing a coherent light beam 2. The lens 1 is arranged so that the beam 2 of the laser 3 impinges thereon, the laser beam and the lens 1 forming an angle α between them. Beneath the arrangement, there is diagrammatically shown an imagined image plane which is designated as a whole by 4 and in which a one-dimensional image of the inherently two-dimensional light surface, to which the beam 2 is expanded, is formed. In the exemplified embodiment shown in FIG. 1, the angle α is 90°. This provides a flat light surface which produces a narrow light trace 5 which extends parallel to the laser beam 2 and perpendicularly to the axis of the lens 1. The light plane itself is vertical to the axis of the lens 1. The beam 2 lies in this plane.

Figure 2:
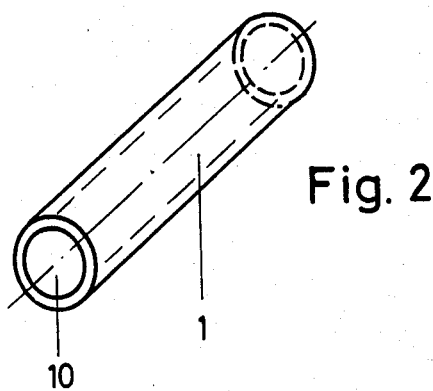
FIG. 2 is the lens according to the invention on a larger scale.

In FIG. 2, the lens 1 is shown on a larger scale. It is designed as a glass tube of circular cross section and comprises in its interior 10 an optically thinner medium, for example air or a fluid.

Figure 3:
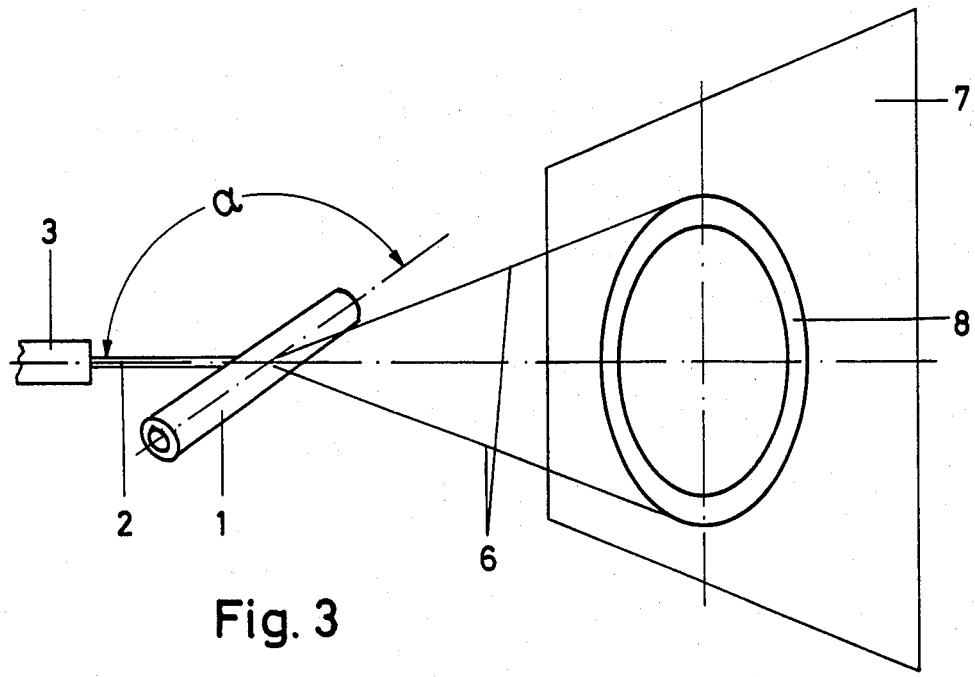
FIG. 3 is the device shown in FIG. 1 but with a different arrangement of the lens.
Figure 4:
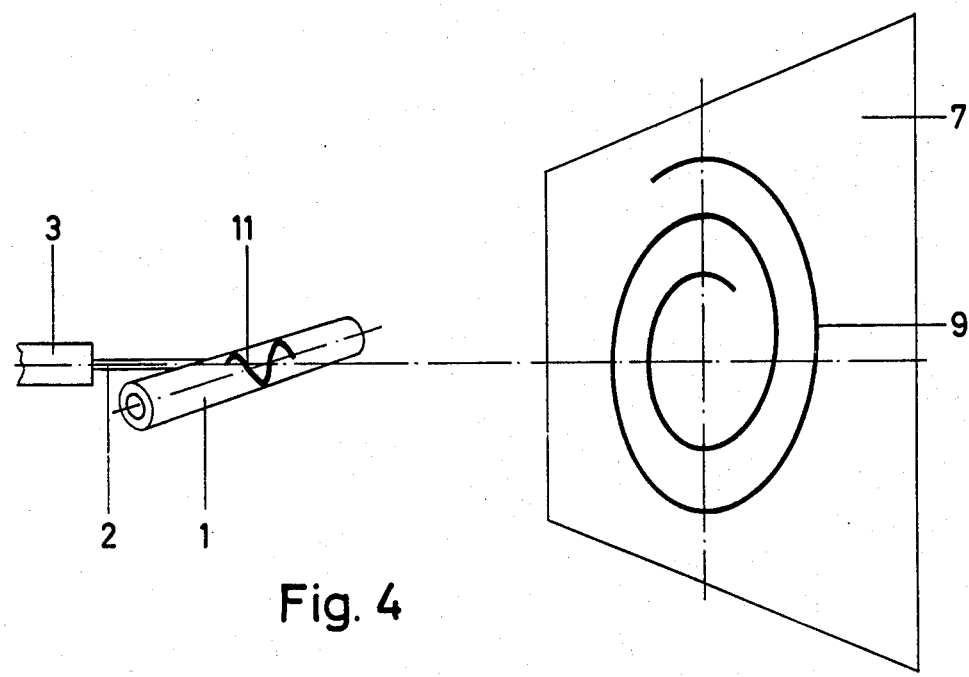
FIG. 4 is a screen image of a spiral surface produced with the device.

If the lens 1 is positioned relative to the laser beam 2 at an angle other than 90°, as shown in FIG. 3, then the flat light surface is deformed into a conical surface 6 which forms on a screen 7, which is arranged vertically to the direction of the laser beam 2, an image of a thin circular ring 8.

If instead of the thin-walled tube shown in FIG. 2 a tube with a thicker wall is used and positioned relative to the laser beam at an angle other than 90°, then there is formed a spiral surface which is imaged on the screen 7 as a thin spiral 9. On the lens itself, a helical light trace 11 can be perceived in this case as the image of the total reflection. This helical line extends, depending on the direction in which the lens is positioned, from the point at which the beam 2 impinges on the lens 1 towards one end thereof.

The lens 1 can, if required, be fitted to an adjusting device with whose aid its positioning angle relative to the beam 2 can be set in a defined manner. For the purpose of reproducibility, it may be advantageous to connect the adjusting device fixedly to the light source 3, for example the laser.

Figure 5:
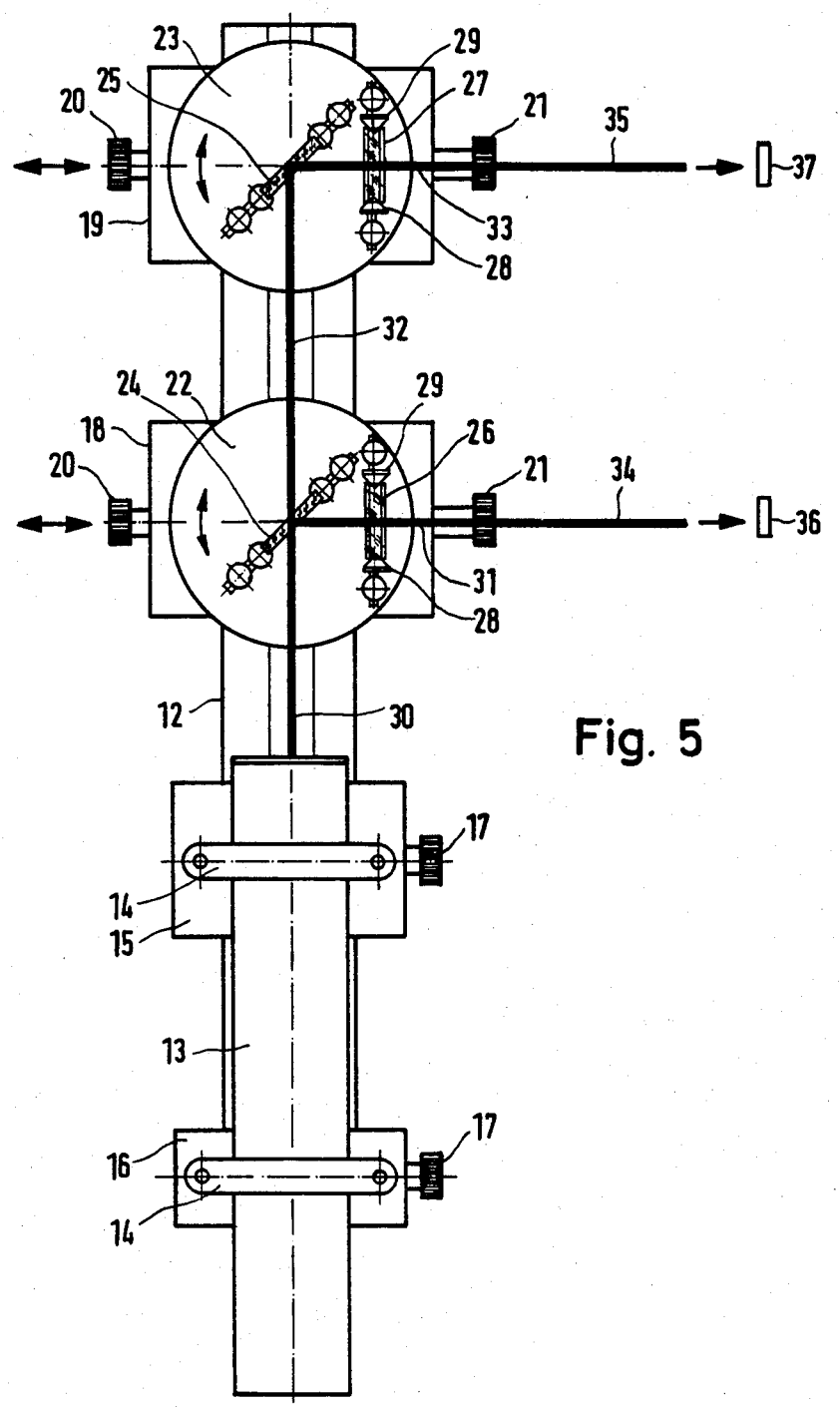
FIG. 5 is a top view of a device for the production of two parallel light surfaces.

A constructional form therefor is shown in FIG. 5.

FIG. 5 shows a laser 13, which is secured to two carriages 15, 16 by means of clamp clips 14, on a foundation plate or slide rail 12. The carriages 15, 16 can be shifted in the axial direction of the laser or be fixed by means of adjusting screws 17. Seated on the slide rail 12 are furthermore two carriages 18, 19 which can also be shifted on the slide rail in the axial direction of the laser 13 (not shown). These carriages, which are designed as co-ordinate tables, can furthermore be moved transversely to the axis of the laser 13 by means of adjusting screws 20. Furthermore, there is seated on each carriage 18, 19 a rotary table 22, 23 which can be rotated about their axes by means of respectively one adjusting screw 21. Finally, each rotary table 22, 23 can be lifted or lowered vertically to the drawing plane by means of an adjusting screw (not shown).

In the exemplified embodiment shown, mirrors 24, 25, which are positioned at an angle of 45° relative to the laser axis, are mounted on the two rotary tables 22, 23. The mirror 24 is partially transparent to the laser beams. A lens 26, 27 made of a glass tube is mounted on each rotary table 22, 23 between two points 28, 29 to the side of and parallel to the laser axis. The point support 28, 29 are axially adjustable, so that it is possible to fit lenses of different diameter.

The laser beam is designated by 30. It impinges initially on the mirror 24 at an angle of 45°, is partly reflected by the mirror as a beam 31 and partly penetrates as a beam 32 and impinges on the second mirror, by which it is reflected through 90° as a beam 33. The beams 31 and 33 penetrate the tubular lenses 26, 27 and are expanded therein to form flat light surfaces 34, 35 which are vertical on the drawing plane and extend not only to the right, as shown in the drawing, but also to the left, unless the surface radiation is interrupted by the appliance.

With the aid of the two parallel light surfaces 34, 35 it is possible to measure, for example, the speed of an object passing through the light surfaces and producing a disconnection on detectors 36, 37. It is furthermore possible to detect and record the longitudinal profile of the object by means of changing the disconnection.

What is claimed is:

1. A device comprising means for providing practically parallel light rays, a cylindrical lens for expanding the practically parallel light rays and means for detecting objects moving outside of the lens said lens being fully cylindrical in design and having an interior cylindrical portion and a peripheral portion surrounding said interior cylindrical portion with an interface between said portions, said interior cylindrical portion being formed from a medium which is optically thinner than said peripheral portion, and said lens being arranged to be disposed relative to said practically parallel light rays such as to give total reflection at the said interface, the light rays being expanded two-dimensionally to an aperture angle of up to 360° with an intensity distribution that is practically constant.

2. A device according to claim 1, wherein said lens has an external surface which is provided with a reflective coating.

3. A device according to claim 1, wherein said interior cylindrical portion is coaxial to the lens.

4. A device according to claim 1, wherein said lens is in the form of a tube.

5. A device according to claim 4, wherein said tube has a circular cross-section.

6. A device according to claim 4, wherein said tube is a glass tube.

7. A device according to claim 1, wherein the lens is arranged on an adjusting means for changing the angular position of the lens relative to the said practically parallel light rays.

8. A device according to claim 7, characterised in that the adjusting means is fixedly connected to said means for providing the practically parallel light rays.

* * * * *